April 18, 1967 J. A. ASHTON 3,315,240
FIXED WORD MAGNETIC MATRIX HAVING NOISE CANCELLATION CORES
Filed Jan. 24, 1964
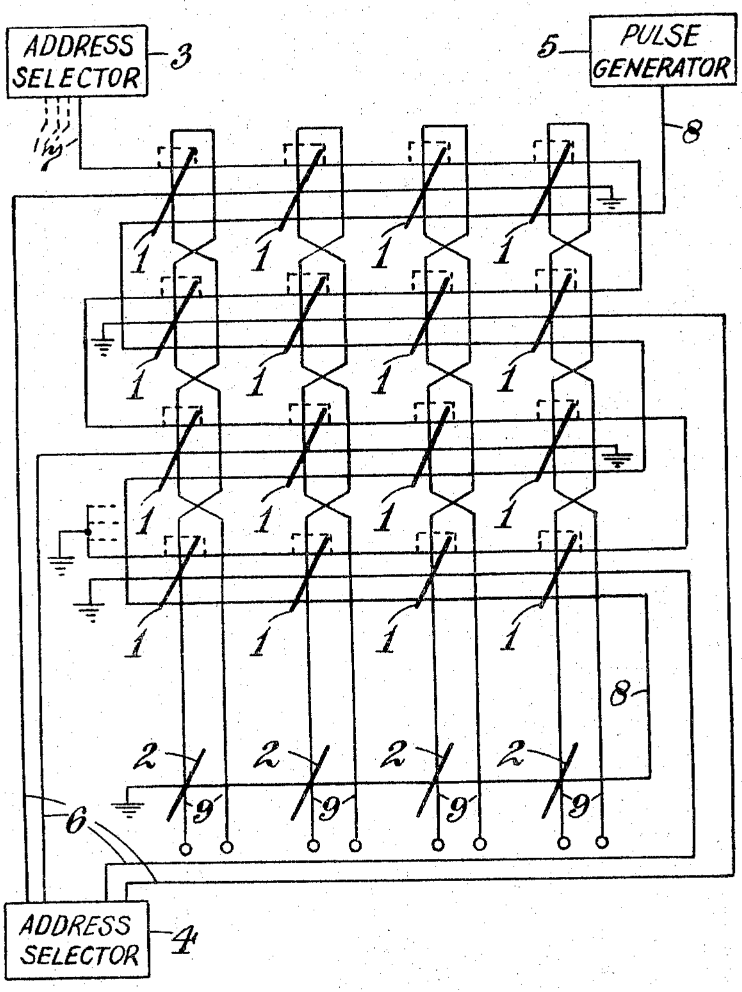

Patented Apr. 18, 1967

3,315,240
FIXED WORD MAGNETIC MATRIX HAVING NOISE CANCELLATION CORES

John Alfred Ashton, London, England, assignor to Decca Limited, London, England, a British company
Filed Jan. 24, 1964, Ser. No. 339,993
Claims priority, application Great Britain, Jan. 31, 1963, 4,074/63
5 Claims. (Cl. 340—174)

This invention relates to digital data stores for storing permanent information using wires coupled to magnetic cores.

According to this invention, a digital data store comprises a plurality of square loop magnetic cores with a plurality of word wires coupled to some or all of the cores, means for applying partial pulses simultaneously to one selected word wire and to one addressing wire coupled to those cores which are to be used to produce an output word, the two partial pulses being sufficient, when simultaneously applied, to switch all the cores coupled to both the selected word wire and the addressing wire but insufficient to switch cores coupled to only one of these wires, a plurality of sense wires corresponding to the number of digits in a word and coupled to the respective cores corresponding to these various digits, a read-out and re-set wire coupled to all the cores for applying a read-out pulse so that signals on the sense wires are obtained from those cores switched by two simultaneous partial pulses and for subsequently applying a re-set pulse to restore the cores to their initial condition.

If the store is required to hold $m$ words of $n$ bits in each word, then the number of cores used may be any multiple of $n$ from 1 to $m$. If this multiple is 1, then there are $n$ cores each coupled to $m$ word wires and by a single addressing wire so that the selected output may be obtained by applying partial pulses to the addressing wire and to one selected word wire. For economy however, it is preferable to use a matrix system in which the multiple is greater than one. It may be shown that, for optimum economy in the addressing circuits, the number of cores required should be as close as practical to $n$ multiplied by the square root of $m$. Assuming the multiple is greater than one, say $p$, then each word wire is coupled to $pn$ cores and is used for $p$ different words and it is necessary to have $p$ separate addressing wires to select the particular word, each addressing wire being coupled to a row of $n$ cores, the various word wires being coupled to different rows. Each of the $n$ sense wires would then be coupled to the appropriate cores of $p$ different rows. In a typical example, a store for 2048 words of 16 bits might have 32 rows of cores, each row containing 16 cores, that is to say 512 cores, so that there are 32 addressing wires and 64 word wires. Thus considered more generally the store may be formed of $pn$ cores, with $p$ separate addressing wires each coupled to a row of $n$ cores and with $k$ word wires each coupled to all the cores, where $kn$ and $p$ are all integers greater than unity; this store will hold $kp$ words each of $n$ bits.

In an arrangement having $p$ rows of $n$ cores and in which the coupling to the cores is such that the output from all the cores is of one polarity, the noise outputs from unselected cores may be appreciable. If single polarity read-out is required, such noise signals may be cancelled by providing $n$ further cores, similar to the store cores, which further cores referred to hereinafter as cancellation cores, are coupled to the read-out and re-set wire and also by the sense wires, the sense wires being coupled each to one of the cancellation cores by $p$ turns. As the read-out and re-set wire is coupled to all the cores, the noise output produced by signals on this wire is always the same and so the cancellation cores, which are also disturbed by the read-out pulse, can fully compensate for this noise output.

In the simplest form, the aforementioned partial pulses may each be "half-pulses," that is to say, if a total current I flowing in wires coupled to a core is sufficient to switch its state then simultaneous pulses of ½I are fed to the selected word wire and addressing wire. To improve the tolerance of the store to variations in ambient temperature and drive current amplitude, it is preferred however to give increased magnitude pulses to the addressing wire and word wire and to apply a simultaneous bias pulse in the opposite direction to the read-out and re-set wire such that the net effect is sufficient to switch a core but such that the bias pulse combined with a pulse on one of the addressing or word wires is not sufficient to switch a core. The preferred magnitudes of the currents on the word wire and addressing wire are ⅔I on each wire, assuming as before that a total current I is required for switching a core and, in this case the bias pulse would be —⅓I so that the total current coupled to a selected core would be $$\tfrac{2}{3}I+\tfrac{2}{3}I-\tfrac{1}{3}I=I$$

Cores which are selected by the word or addressing wire alone would have a net applied current of $$\tfrac{2}{3}I-\tfrac{1}{3}I=\tfrac{1}{3}I$$

and all the remaining cores are pulsed only by the biasing current, i.e., —⅓I. By this mode of operation, the input currents or the core characteristics may change appreciably before unselected cores are switched and thus operating margins are improved.

Further features of the invention will be apparent from the following description of one embodiment, illustrated in the accompanying drawing which is a diagram showing a small store containing 16 words of 4 bits each. It will be understood that, in practice, stores would in general be very much larger than this but this small store is illustrated for simplicity.

Referring to the drawing, there is shown a matrix of sixteen cores 1 associated with the storage and four cores 2 which are for purposes of noise cancellation in sense wires 9. Two address selectors 3, 4, produce simultaneous current pulses in one each of their output wires, and a further generator 5, produces bias and read-out current pulses. Output wires 6 of address selector 4 thread the matrix in a horizontal direction, entering from opposite sides in alternate rows. The output wires 7 of address selector 3 only one of which is shown, also thread the matrix in a horizontal direction, but in this case each wire threads every row, criss-crossing to and fro so that it threads each row in the same direction as a wire from address selector 4. The wires 7 constitute the aforementioned word wires and are coupled only to those cores for which an output signal is required in the appropriate word, omitting the other cores as indicated diagrammatically by the dashed lines indicating that some cores may be by-passed. A bias and read-out wire 8, criss-crosses in the same fashion, except that in every row it threads in the opposite direction to the addressing wires. The sense wires 9, thread in a vertical direction and are arranged as a loop, alternate cores being threaded by opposite sides of the loop. The cancellation cores 2, which are similar to the matrix cores 1, are threaded by the bias/read-out wire 8 and by the sense wires 9, the number of turns that each sense wire 9 threads a core 2 being equal to the number of horizontal rows in the matrix.

It is assumed that the cores used are such that a total current I flowing in wires threading the core is sufficient to switch its state, whereas a current of ½I is insufficient. In the simplest operation of the store, the address selectors 3, 4, give simultaneous pulses of magnitude ½I on one each of their outputs. If the appropriate output wire 7 threads all cores 1 in the matrix, then all cores on the row which is also threaded by the pulsed addressing wire 6, will have a total current of I applied and will switch. The remaining cores will only have ½I applied and will therefore not switch. If the wire 7 by-passes some of the cores in the selected row, then these cores will also have only ½I and will not switch. Thus, if the wire 7 is arranged to thread only those cores in bit positions in which it is desired to store 1, and by-pass those positions in which it is desired to store 0, then at the conclusion of the selection pulses the stored word is held as a pattern of set cores. A subsequent re-set pulse in the bias/read-out wire re-sets these cores and causes a voltage pulse to appear on the appropriate sense wires.

Each wire 7, is threaded over all rows of the matrix, and so it is possible to select any section of this wire by pulsing the appropriate addressing wire 6. Only those cores on the selected wire 6, which are also threaded by the selected wire 7, will switch to the set state, and subsequently give an output when the read-out pulse switches them in the reverse direction. The stored words of information are therefore held as a pattern of wires, the digit stored in any position being determined by whether or not a wire 7 threads through a core 1, the core 1 itself merely providing functions of gating and read-out. The number of words stored is equal to the product of the number of rows in the matrix and the number of wires 7: the simple store of the figure therefore holds 16 words.

To improve the tolerance of the store to variations in ambient temperature and drive current amplitude, an alternative system of driving is possible. The amplitude of the pulses from current generators 3 and 4 is increased to ⅔I, and current generator 5 is arranged to give a bias pulse of amplitude −⅓I simultaneously. Thus the selected cores have a net current applied of:

$$\tfrac{2}{3}I+\tfrac{2}{3}I-\tfrac{1}{3}I=I$$

as before. Cores which are selected by either of the pulsed wires 6, 7 alone have a net applied current of $$\tfrac{2}{3}I-\tfrac{1}{3}I=\tfrac{1}{3}I$$

and all remaining cores are pulsed only by the current in the bias wire 8 and have a net applied current of −⅓I. In this mode of operation the input currents or the core characteristics may change appreciably before unselected cores are spuriously switched, and operating margins are therefore improved.

Whichever drive system is employed, the current generator 5 gives a pulse of amplitude I to re-set the cores and provide read-out. The manner in which the sense wires 9 are wound onto the matrix ensures that the output from all cores is of one polarity so that design of sense amplifiers is eased. It also means, however, that the noise outputs from unselected cores are of the same polarity, and for a large matrix the total noise can be of comparable amplitude to the signal. As the read-out wire 8 threads all cores 1 this noise output is always the same, and so the cancellation cores 2, which are also disturbed by the read-out pulse, can fully compensate for this noise output if each sense wire 9 links the cancellation core 2 with as many turns as it links disturbed cores 1, i.e. the number of horizontal rows in the matrix.

I claim:

1. A digital data fixed word store comprising $p \cdot n$ square loop magnetic cores; $k$ word wires each coupled to at least some of the cores, each word wire coupling those cores which are to produce, for the respective words associated with said word wire, one of the two binary digital values, and not coupling those cores which are to produce, for said respective words, the other binary digit value: $p$, $k$ and $n$ being integers greater than unity; $p$ separate addressing wires each coupled to a set of $n$ cores used to produce an output word of $n$ binary digits; pulse applying means for applying partial pulses simultaneously to one selected word wire and to one addressing wire, said two partial pulses being sufficient, when simultaneously applied, to switch to the same state all the cores coupled by both the selected word wire and the selected addressing wire, but being insufficient to switch to said same state cores coupled to only one of these wires; $n$ sense wires, corresponding to the number of digits in a word, and coupled to the respective cores corresponding to these various digits; a read out and reset wire coupled to all the cores said pulse applying means applying a pulse to said read-out and reset wire restore all the cores to the same initial condition and to simultaneously read out said output word; and $n$ cancellation cores, each coupled by the read-out and reset wire and each coupled by $p$ turns of a respective sense wire.

2. A digital data store as claimed in claim 1 and having the cores arranged in a matrix with a plurality of addressing wires, one to each of the rows of the matrix, wherein the word wires are all coupled to the required cores of half the rows in one sense and to the remaining rows in the opposite sense, the appropriate addressing wire to each row being coupled to the cores of a row in the same sense as the word wires.

3. A digital data store as claimed in claim 1 wherein said pulse applying means applies partial pulses greater than half pulses to one selected word wire and one selected addressing wire and simultaneously a bias pulse in the opposite sense to the read out and reset wire, whereby the net effect of said two partial pulses and the bias pulse on one core is insufficient to switch the core but such that said bias pulse combined with a single partial pulse is not sufficient to switch a core.

4. A digital data store as claimed in claim 3 wherein the partial pulses are each of a magnitude ⅔I where I is the current required to switch a core whilst the bias pulse is of a magnitude ⅓I.

5. A digital data fixed word store comprising $p \cdot n$ square loop magnetic cores, said cores requiring a current of magnitude I to be switched from a first state to a second state, $k$ word wires each coupled to at least some of said cores, each word wire coupling those cores which, are to produce, for the respective words associated with said word wire, one of the two binary digit values, and not coupling those cores which are to produce, for said respective words, the other binary digit value, $p$, $k$ and $n$ being integers greater than unity; $p$ separate addressing wires each coupled to a set of $n$ cores used to produce an output word of $n$ binary digits pulse applying means for applying partial pulses of magnitude ⅔I simultaneously to one selected word wire and to one addressing wire; $n$ sense wires corresponding to the number of digits in a word and coupled to the respective cores corresponding to these various digits, a bias, readout and reset wire coupled to all the cores, said pulse applying means applying a bias of magnitude ⅓I to said bias, readout and reset wire simultaneously with said partial pulses of magnitude ⅔I, and applying a subsequent reset pulse to said bias, readout and reset wire to restore said cores to said first state and to read-out said output word; $n$ cancellation cores, each coupled by said bias, readout and reset wire and each coupled by $p$ turns of a respective sense wire.

References Cited by the Examiner

UNITED STATES PATENTS

| | | | |
|---|---|---|---|
| 2,942,239 | 6/1960 | Eckert | 340—174 |
| 3,115,619 | 12/1963 | Barrett et al. | 340—174 |

BERNARD KONICK, *Primary Examiner.*

S. M. URYNOWICZ, *Assistant Examiner.*